US011778963B2

(12) United States Patent
Defrank et al.

(10) Patent No.: US 11,778,963 B2
(45) Date of Patent: Oct. 10, 2023

(54) LOW FLOW EMITTER WITH ECHELON SHAPED TEETH

(71) Applicant: Jain Irrigation Systems Limited, Maharashtra (IN)

(72) Inventors: Michael Patrick Defrank, Madera, CA (US); Ajit Bhavarlal Jain, Jalgaon (IN)

(73) Assignee: Jain Irrigation Systems Limited, Bambhori (IN)

( * ) Notice: Subject to any disclaimer, the term of this patent is extended or adjusted under 35 U.S.C. 154(b) by 143 days.

(21) Appl. No.: 15/032,593

(22) PCT Filed: Oct. 28, 2014

(86) PCT No.: PCT/IN2014/000683
§ 371 (c)(1),
(2) Date: Apr. 27, 2016

(87) PCT Pub. No.: WO2015/075740
PCT Pub. Date: May 28, 2015

(65) Prior Publication Data
US 2016/0295815 A1  Oct. 13, 2016

(30) Foreign Application Priority Data

Oct. 28, 2013  (IN) .......................... 3386/MUM/2013

(51) Int. Cl.
*A01G 25/02* (2006.01)
*F16L 11/12* (2006.01)

(52) U.S. Cl.
CPC .......... *A01G 25/023* (2013.01); *F16L 11/12* (2013.01)

(58) Field of Classification Search
CPC .......................... A01G 25/023; A01G 25/026
USPC .................................... 239/542, 547
See application file for complete search history.

(56) References Cited

U.S. PATENT DOCUMENTS

| 7,175,113 | B2 | 2/2007 | Cohen |
| 7,681,810 | B2 | 3/2010 | Keren |
| 7,735,758 | B2 | 6/2010 | Cohen |
| 8,141,589 | B2 | 3/2012 | Socolsky |
| 2010/0244315 | A1 | 9/2010 | Mamo |
| 2011/0186652 | A1* | 8/2011 | Cohen ............ A01G 25/023 239/542 |
| 2012/0012682 | A1* | 1/2012 | Einav ............ A01G 25/023 239/542 |
| 2013/0248616 | A1 | 9/2013 | Ensworth et al. |

OTHER PUBLICATIONS

International Search Report dated Jun. 15, 2015 for International Application No. PCT/IN2014/000683, 2 pages.
Written Opinion dated Jun. 15, 2015 for International Application No. PCT/IN2014/000683, 3 pages.

* cited by examiner

*Primary Examiner* — Jason J Boeckmann
(74) *Attorney, Agent, or Firm* — McCarter & English, LLP

(57) ABSTRACT

Disclosed is an emitter comprising a plurality of holes 106, running along a first edge 102 and a second edge 104 of the emitter. The emitter 100 may further comprise of an echelon shaped teeth portion 114. The echelon shaped teeth portion may run parallel to the first edge 102 and the second edge 104. Further the echelon shaped teeth portion 114 at least partially extends between the first side 110 and the second side 112.

4 Claims, 15 Drawing Sheets

LOW FLOW EMITTER WITH ECHELON SHAPED TEETH

RELATED APPLICATIONS

This application is a 35 U.S.C. § 371 national stage filing of International Application No. PCT/IN2014/000683, filed on Oct. 28, 2014, which claims benefit of and priority to Indian Patent Application No. 3386/MUM/2013, filed on Oct. 28, 2013. The contents of each of the foregoing applications are hereby incorporated by reference in their entirety.

TECHNICAL FIELD

The present subject matter described herein, in general, relates to drip irrigation, and more particularly to an emitter used in the drip irrigation.

BACKGROUND

Conventionally, achieving low flow in an emitter involves minimizing the cross sectional area of the flow path. There are two ways to reduce the cross sectional area of the flow path, i.e. either by lowering the ceiling or by minimizing teeth gap. The flow in the flow path is disrupted by inserting teeth. The problem with the above methods of reducing the cross sectional area of flow path is increasing the likelihood of the flow path clogging. Clogging happens when small particles entering from the inlet gets accumulated in microscopic openings. The end result is that water no longer flows in the flow path, rendering the emitter un-usable.

SUMMARY

This summary is provided to introduce aspects related to an emitter and the aspects are further described below in the detailed description. This summary is not intended to identify essential features of the claimed subject matter nor is it intended for use in determining or limiting the scope of the claimed subject matter.

In one implementation an emitter is disclosed. The emitter may comprise a plurality of holes. The plurality of holes may run parallel to a first edge of the emitter and a second edge of the emitter. Further, the emitter may comprise of an echelon shaped teeth portion. The echelon shaped teeth portion may at least partially extend between a first side of the emitter and a second side of the emitter. The echelon shaped teeth may run parallel to the first edge, and the second edge.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

The present subject matter discloses an emitter configured to allow for low flow rate of water in a drip irrigation system.

In the proposed invention, the echelon shaped teeth allows the emitter to better disrupt the flow of fluid, thus creating more vectors in the flow-path which results in a lower flow when compared to the same emitter using the typical straight tooth design.

In addition to lower flow, the echelon shaped teeth enables opening up the flow path by raising the ceiling and creating more distance between teeth. This provides the advantages of reducing the flow rate and a lesser chance of clogging due to the increased cross-sectional area of the flow path.

Figure 1:
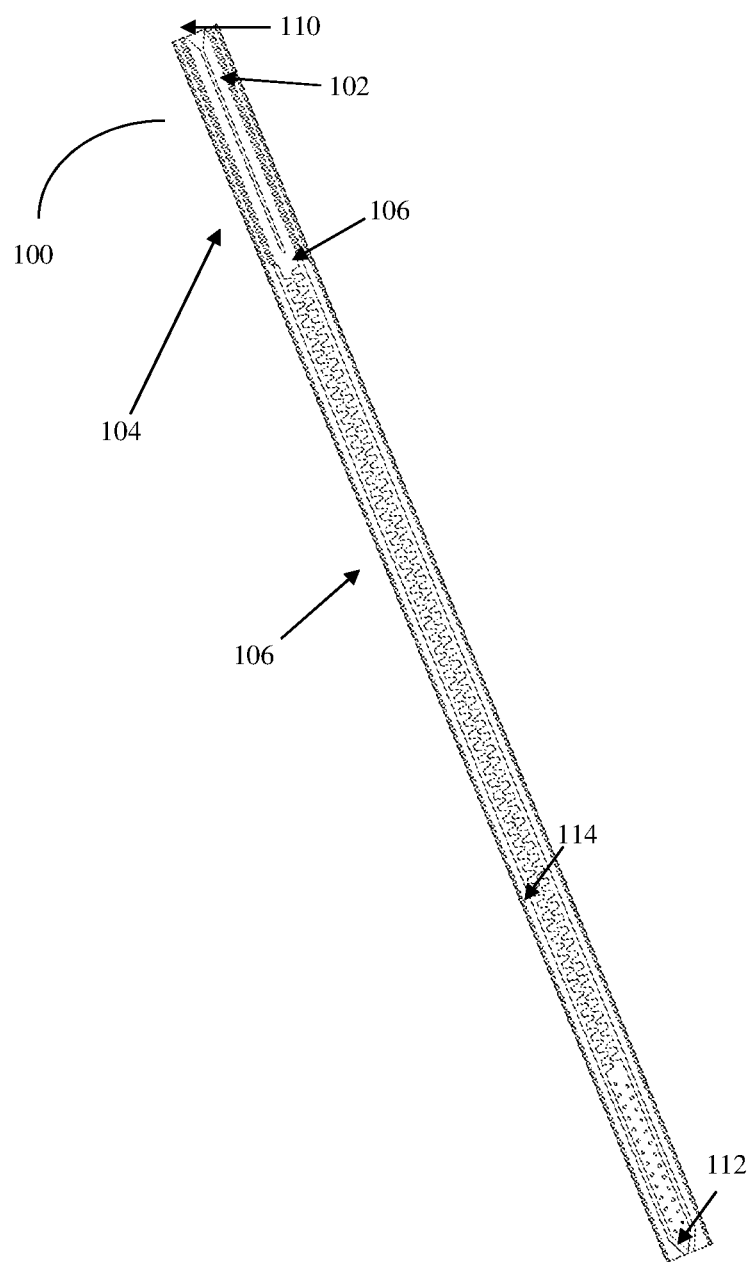
FIG. 1 illustrates a perspective view of an emitter, in accordance with an embodiment of the present subject matter.

Referring to FIG. 1, a perspective view of an emitter 100, in accordance with an embodiment of the present subject matter. The emitter 100 may comprise of a plurality of holes 106, running along a first edge 102 and a second edge 104 of the emitter. The plurality of holes 106 may act has additional filter for filtration of slits and/or impurities. Further, the plurality of holes 106 may run along periphery of the emitter 100. The plurality of holes may extend on entire length of the emitter 100 or at least partial length of the emitter 100, between a first side 110 and a second side 112. The emitter 100 may further comprise of an echelon shaped teeth portion 114. The echelon shaped teeth portion may run parallel to the first edge 102 and the second edge 104.

Further the echelon shaped teeth portion 114 at least partially extends between the first side 110 and the second side 112. According to an exemplary embodiment creating more distance between two consecutive teeth's i.e. a gap between two consecutive teeth of the echelon teeth shaped portion may be substantial to provide increased cross-section.

Figure 2:
FIG. 2 illustrates a full length "6 inch deluxe TT 17×15 complete 3 up" flow model in accordance with an embodiment of the present subject matter.
Figure 2:
Figure 12:
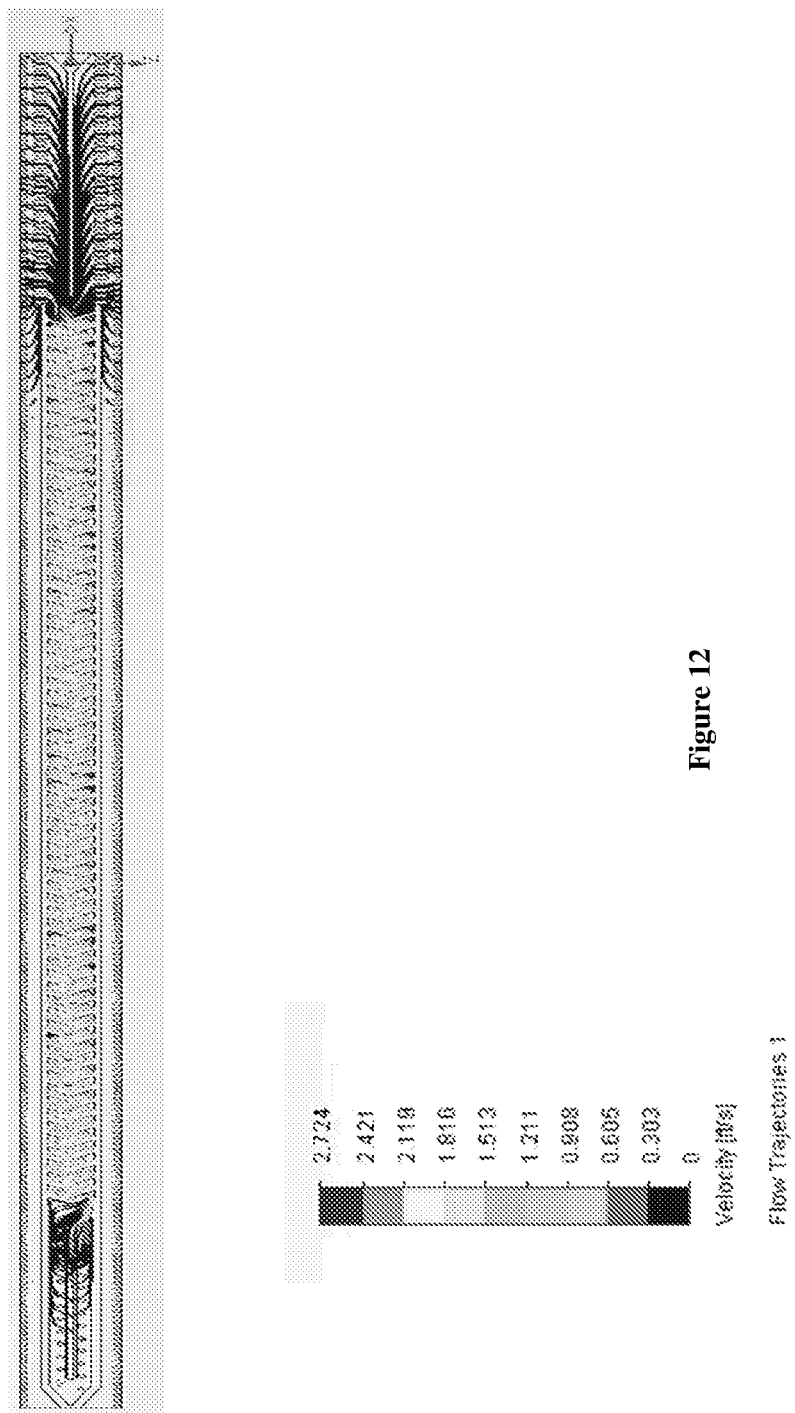
FIG. 12 illustrates a full length "8 inch deluxe TT 17×15" flow model, in accordance with an embodiment of the present subject matter.

FIG. 2 and FIG. 12 shows the two embodiments "6 inch deluxe TT 17×15 complete 3 up" and "8 inch TT Deluxe 17×15" flow model, which have their own flow rates. The two embodiments can be implemented in different situations based on the flow-rate required.

Figure 3:
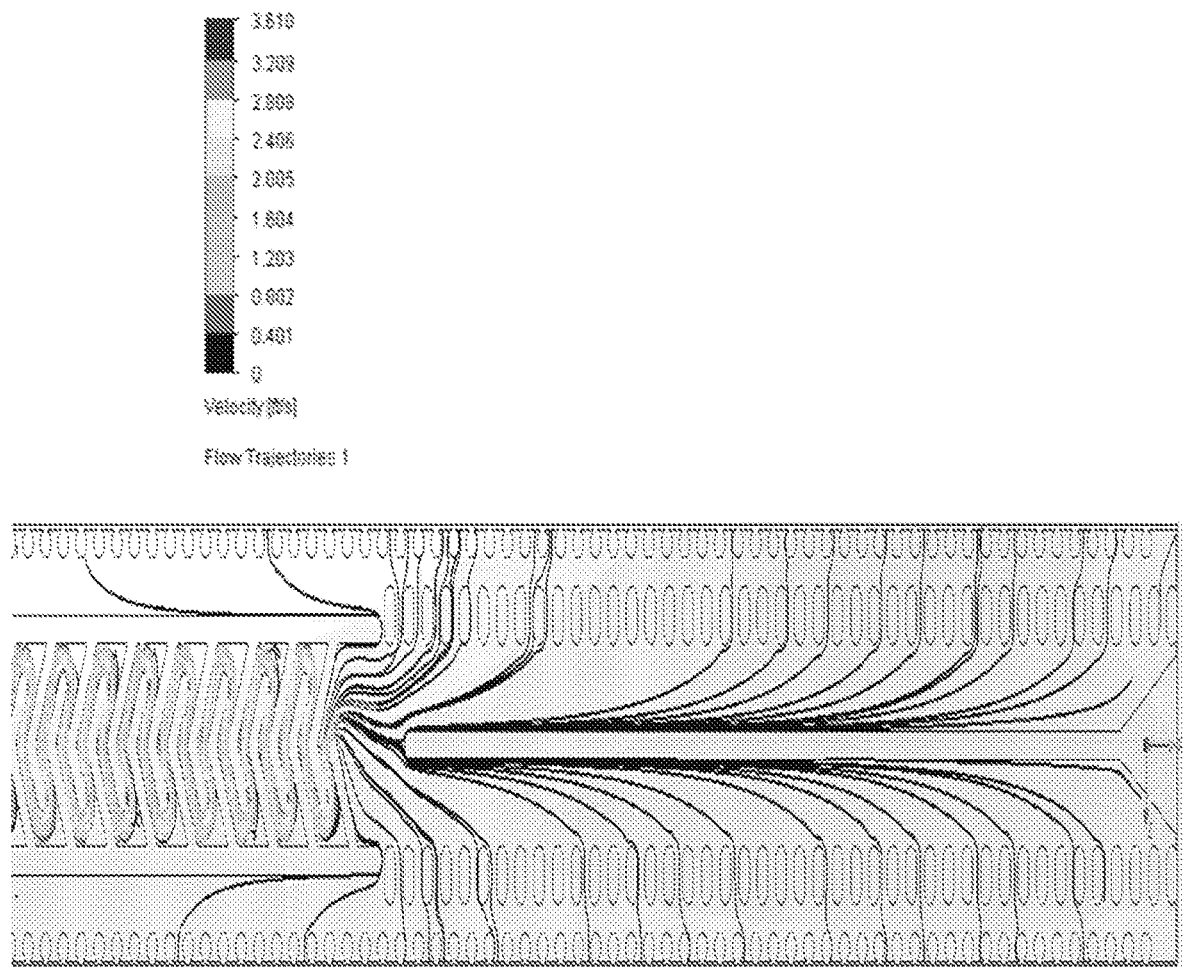
FIG. 3 illustrates a front flow-path inlet of the "6 inch deluxe TT 17×15 complete 3 up" flow model, in accordance with an embodiment of the present subject matter.

FIG. 3 illustrates a front flow-path inlet of the "6 inch deluxe TT 17×15 complete 3 up" flow model, in accordance with an embodiment of the present subject matter. The flow-rate per device in front flow-path is 0.348357LPH (Liters per hour) or 0.092026178GPH (Gallons per hour) or 0.00153377GPM (Gallons per minute) or 0.230065446GPM per 100 feet.

Figure 4:
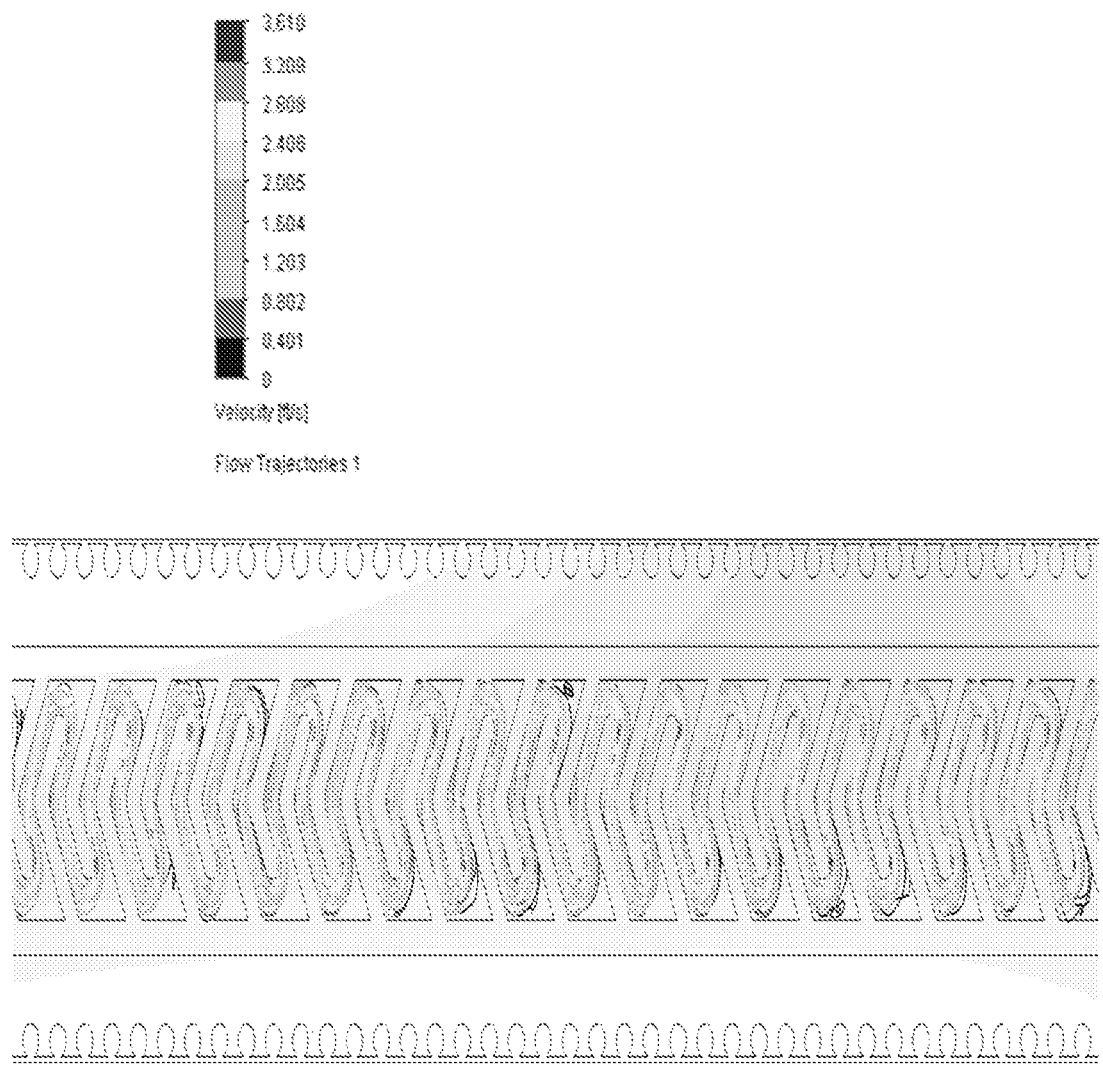
FIG. 4 illustrates a front flow-path middle of the "6 inch deluxe TT 17×15 complete 3 up" flow model, in accordance with an embodiment of the present subject matter.

Now referring to FIG. 4 illustrates a front flow-path middle of the "6 inch deluxe TT 17×15 complete 3 up" flow model, in accordance with an embodiment of the present subject matter. The flow-rate per device in middle flow-path is 0.347652LPH (Liters per hour) or 0.091839937GPH (Gallons per hour) or 0.001530666GPM (Gallons per minute) or 0.229599843GPM per 100 feet.

Figure 5:
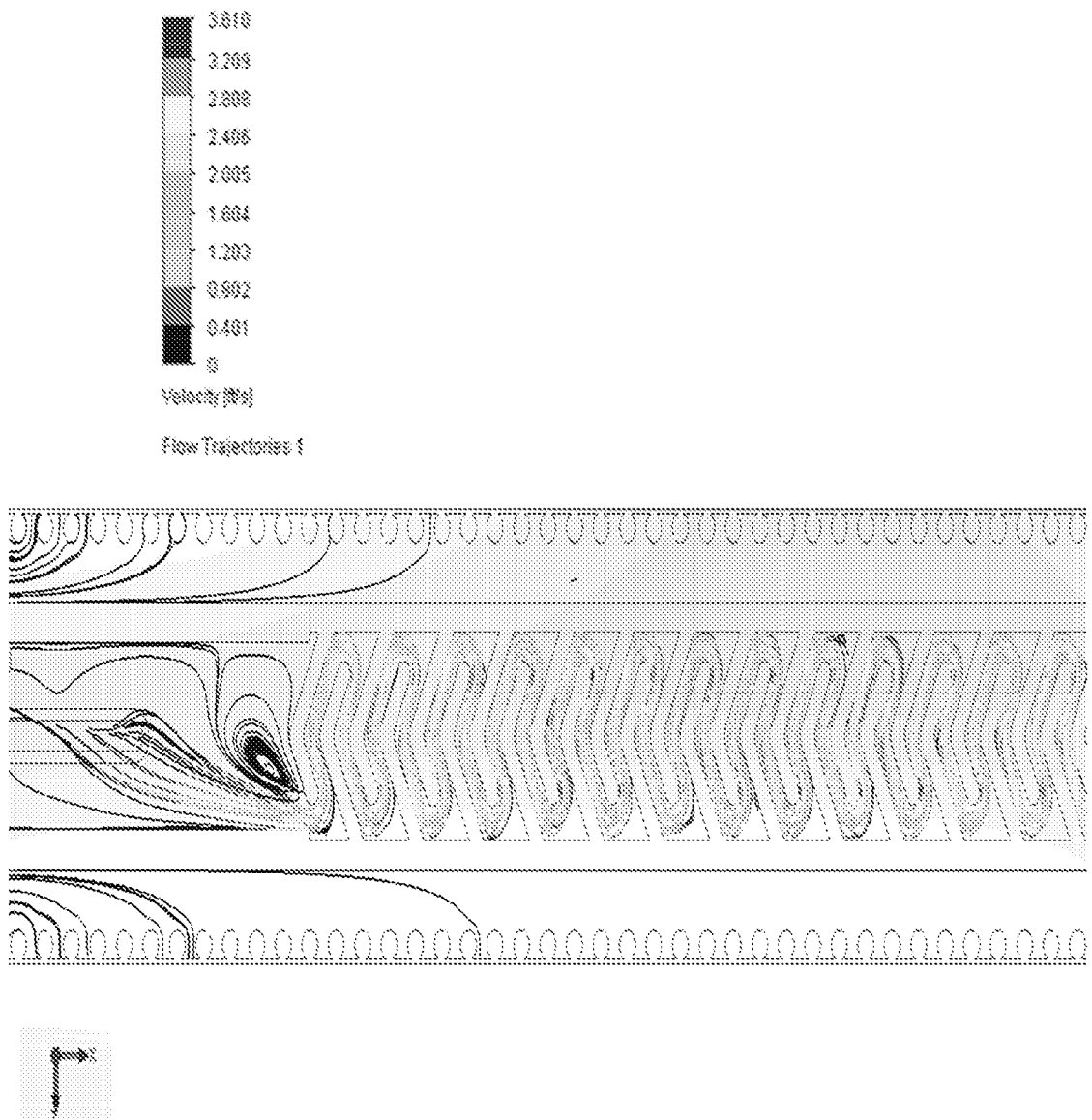
FIG. 5 illustrates a front flow-path outlet of the "6 inch deluxe TT 17×15 complete 3 up" flow model, in accordance with an embodiment of the present subject matter.

FIG. 5 illustrates a front flow-path outlet of the "6 inch deluxe TT 17×15 complete 3 up" flow model, in accordance with an embodiment of the present subject matter.

Figure 6:
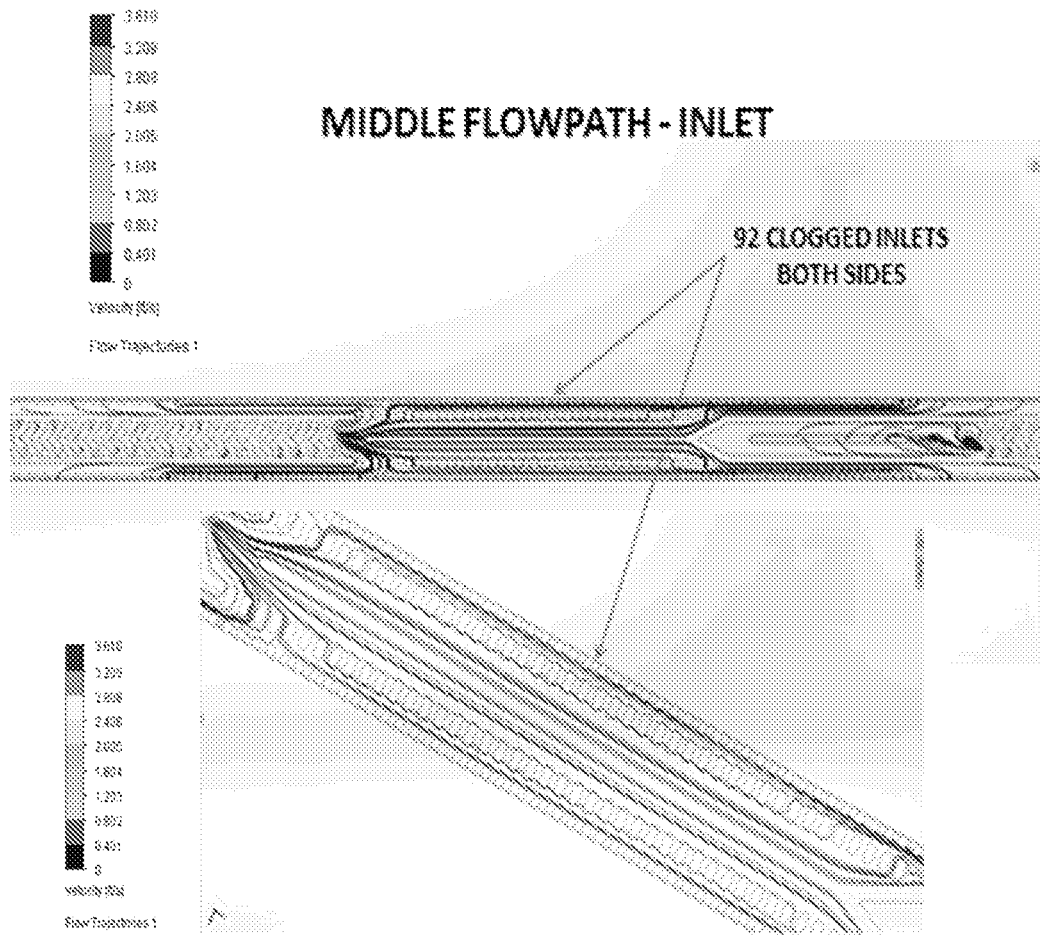
FIG. 6 illustrates a middle flow-path inlet of the "6 inch deluxe TT 17×15 complete 3 up" flow model, in accordance with an embodiment of the present subject matter.

FIG. 6 illustrates a middle flow-path inlet of the "6 inch deluxe TT 17×15 complete 3 up" flow model, in accordance with an embodiment of the present subject matter. According to the exemplary embodiment flow can still occur even through a multitude of inlet clog.

Figure 7:
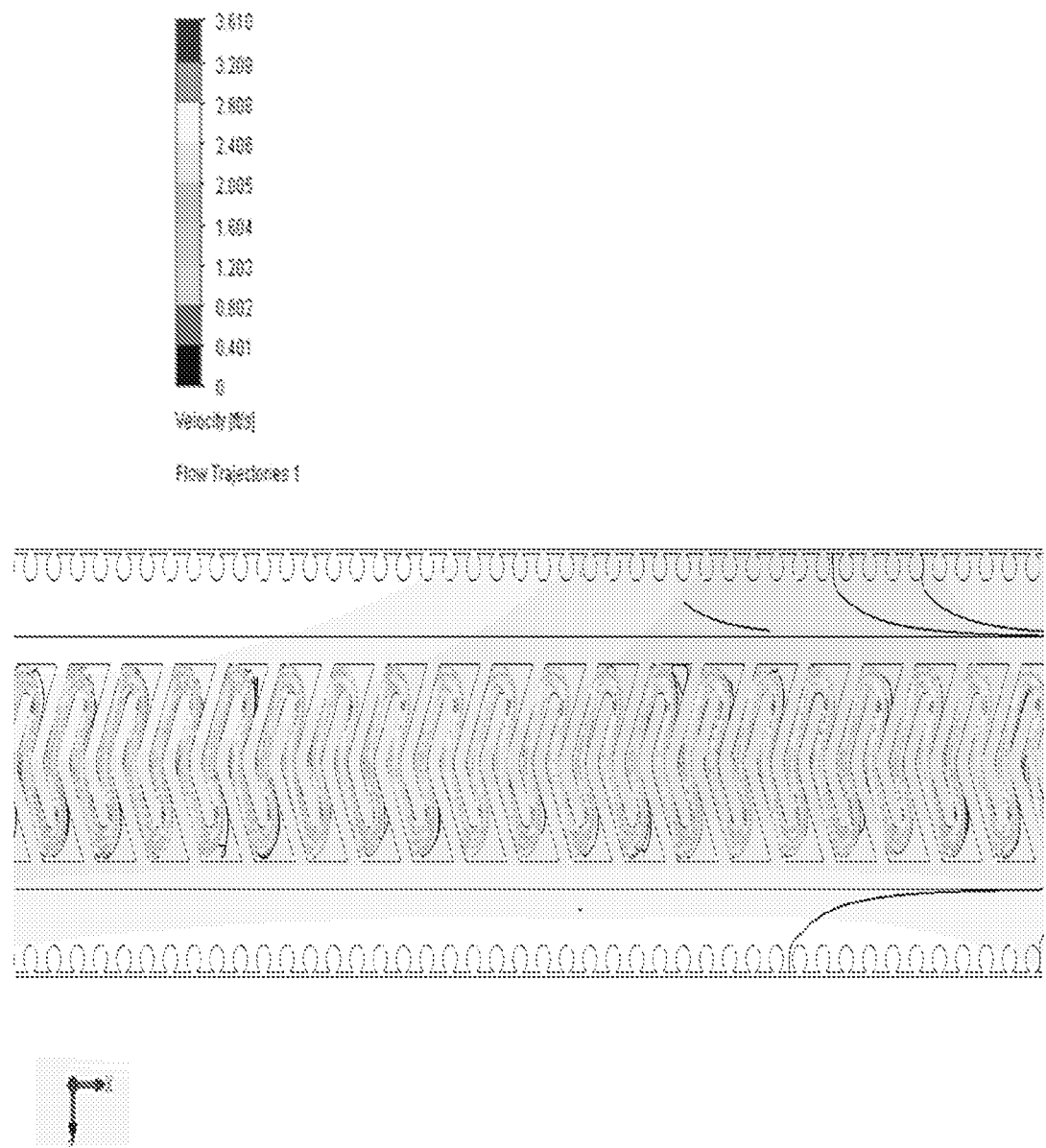
FIG. 7 illustrates a middle flow-path middle of the "6 inch deluxe TT 17×15 complete 3 up" flow model, in accordance with an embodiment of the present subject matter.

FIG. 7 illustrates a middle flow-path middle of the "6 inch deluxe TT 17×15 complete 3 up" flow model, in accordance with an embodiment of the present subject matter.

Figure 8:
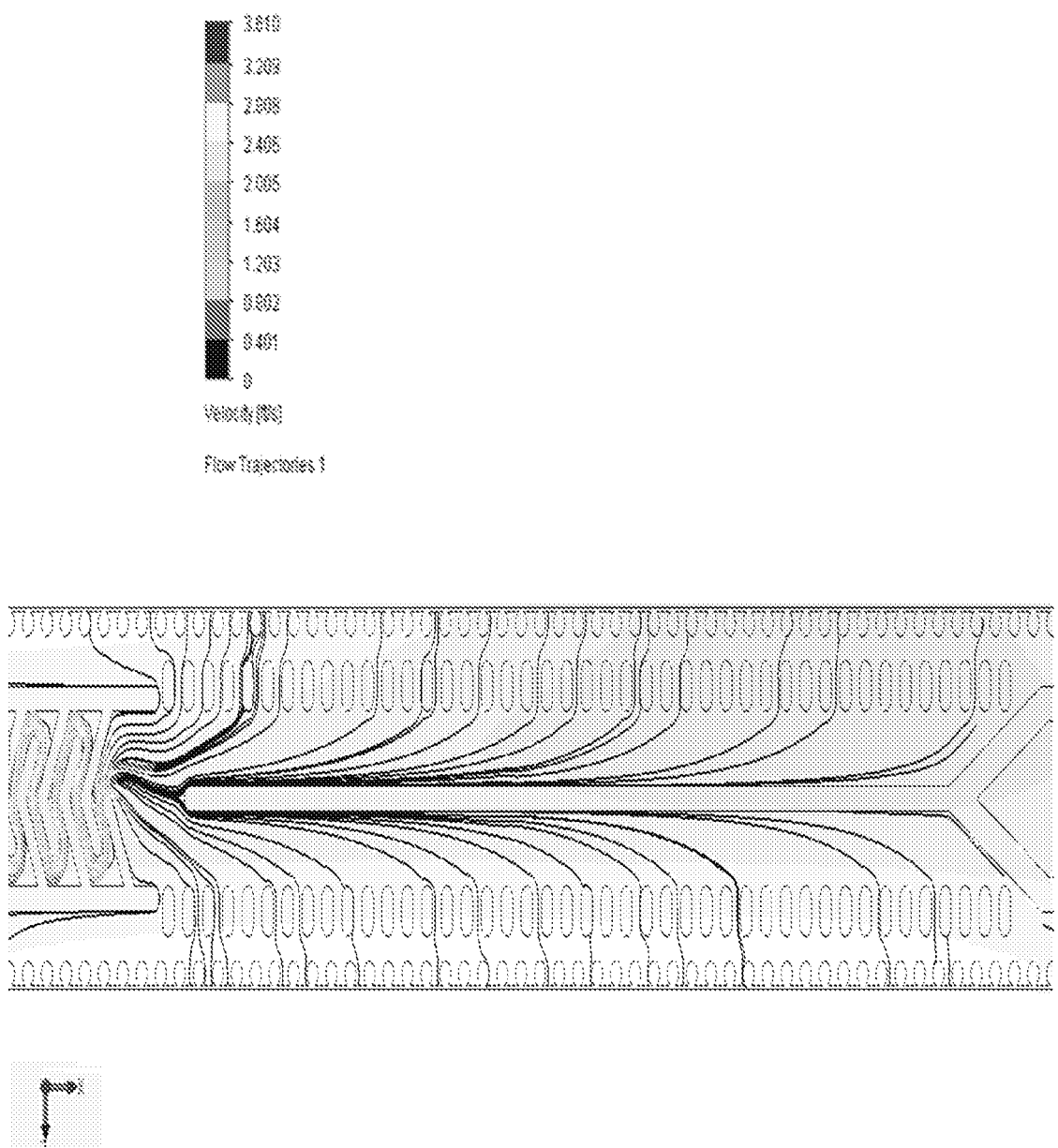
FIG. 8 illustrates a middle flow-path outlet of the "6 inch deluxe TT 17×15 complete 3 up" flow model, in accordance with an embodiment of the present subject matter.

FIG. 8 illustrates a middle flow-path outlet of the "6 inch deluxe TT 17×15 complete 3 up" flow model, in accordance with an embodiment of the present subject matter.

Figure 9:
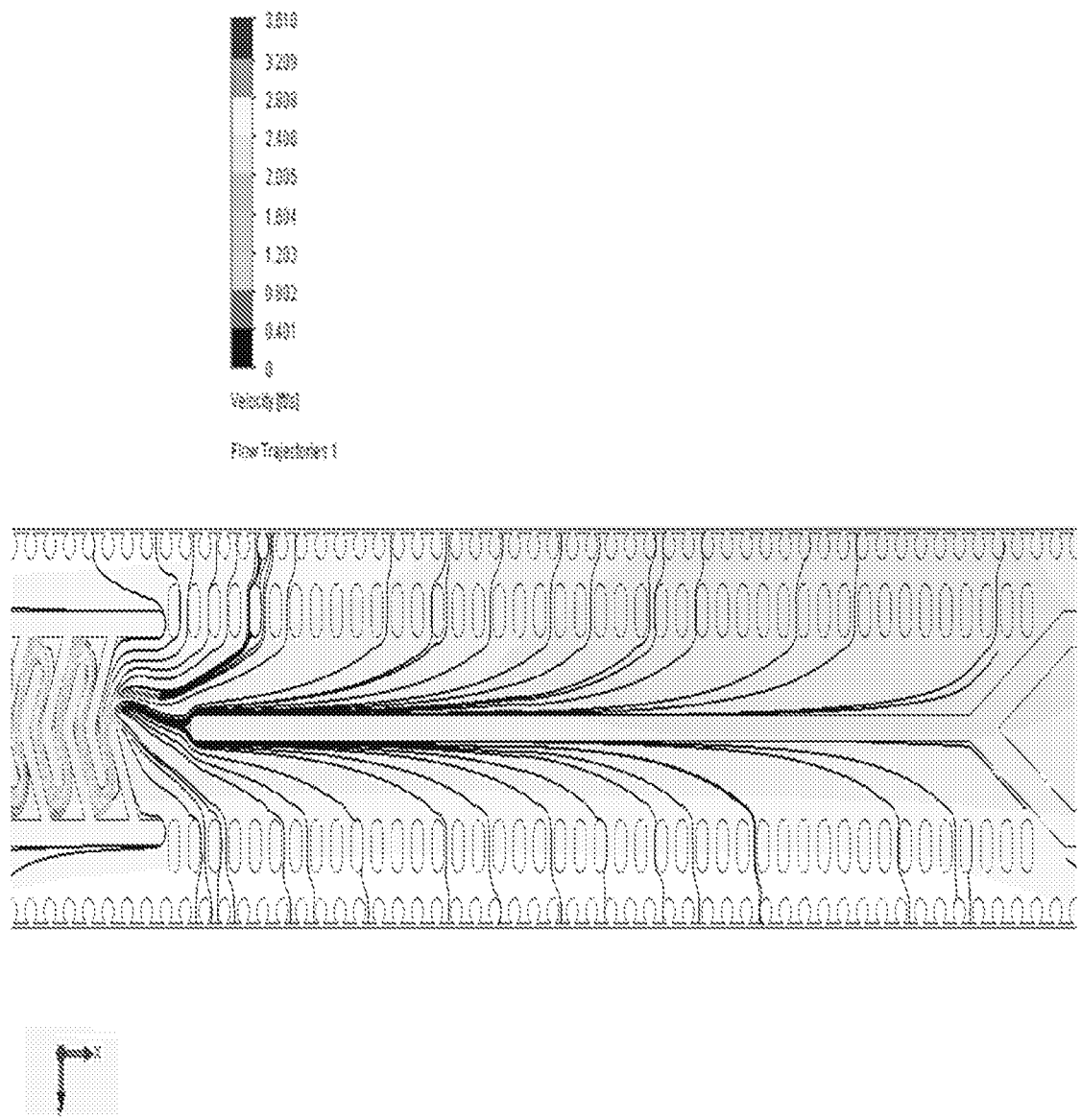
FIG. 9 illustrates a back flow-path inlet of the "6 inch deluxe TT 17×15 complete 3 up" flow model, in accordance with an embodiment of the present subject matter.

FIG. 9 illustrates a back flow-path inlet of the "6 inch deluxe TT 17×15 complete 3 up" flow model, in accordance with an embodiment of the present subject matter. The flow-rate per device in back flow-path is 0.348174LPH (Litters per hour) or 0.091977835GPH (Gallons per hour) or 0.001532964GPM (Gallons per minute) or 0.229944587GPM per 100 feet.

Figure 10:
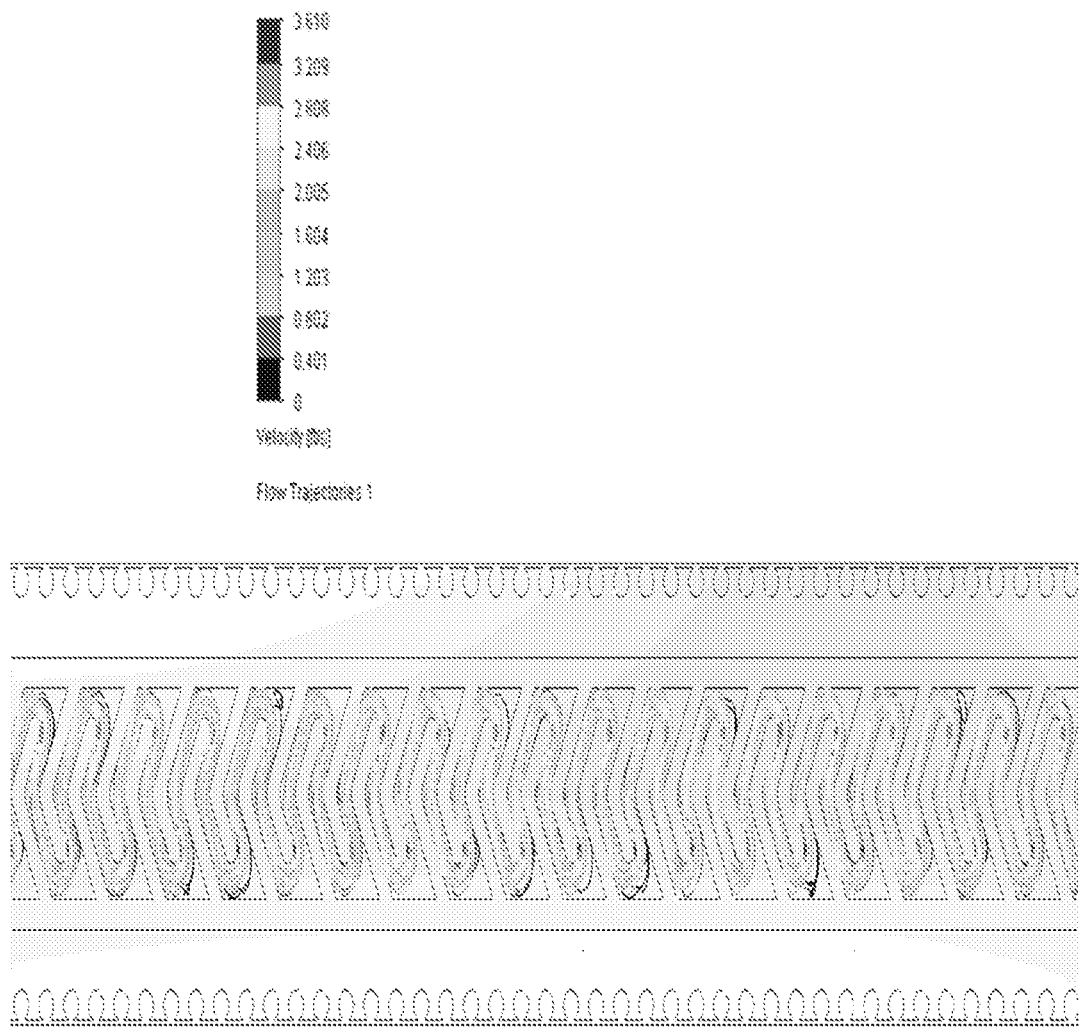
FIG. 10 illustrates a back flow-path middle of the "6 inch deluxe TT 17×15 complete 3 up" flow model, in accordance with an embodiment of the present subject matter.

FIG. 10 illustrates a back flow-path middle of the "6 inch deluxe TT 17×15 complete 3 up" flow model, in accordance with an embodiment of the present subject matter.

Figure 11:
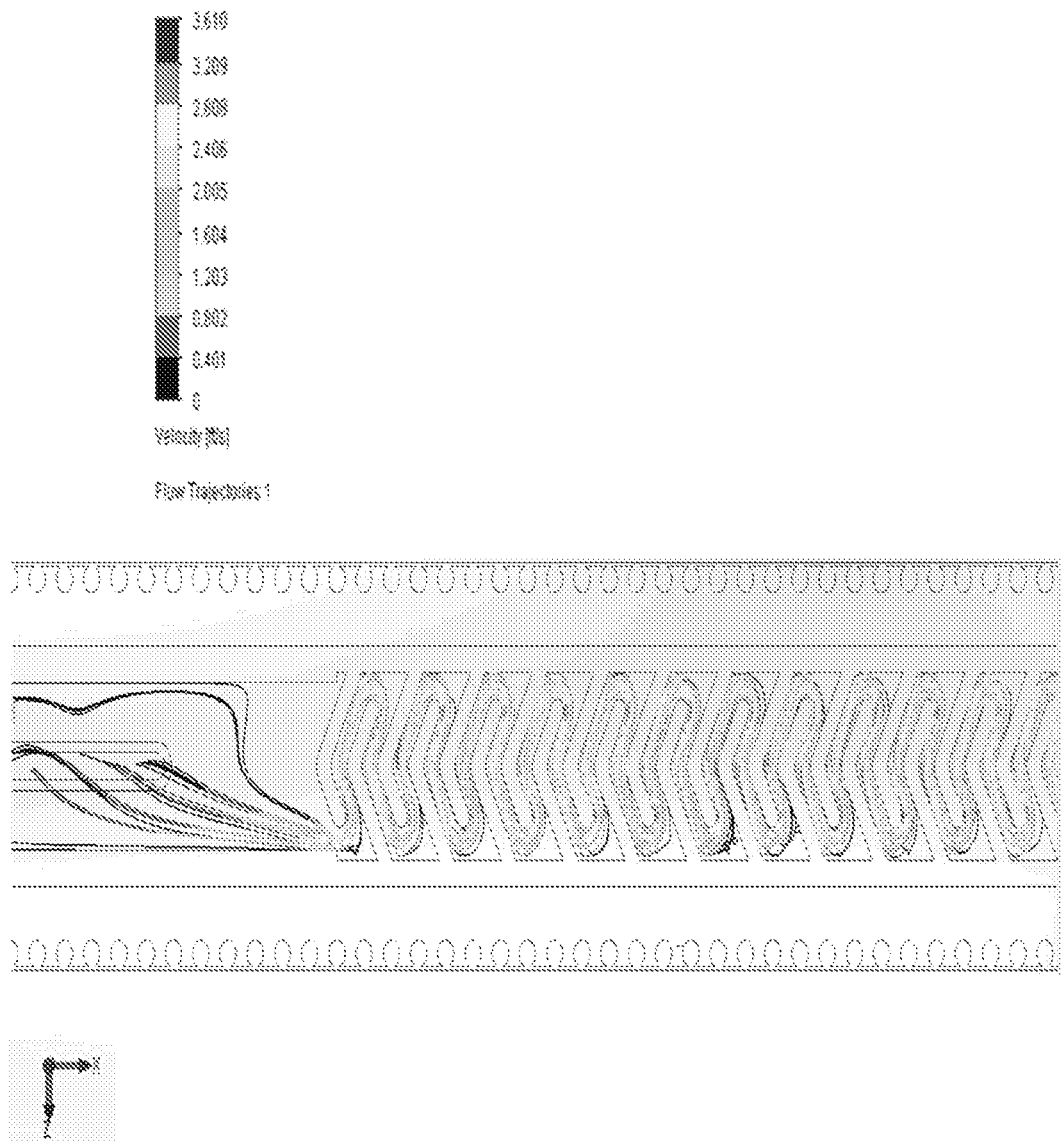
FIG. 11 illustrates a back flow-path outlet of the "6 inch deluxe TT 17×15 complete 3 up" flow model, in accordance with an embodiment of the present subject matter.

FIG. 11 illustrates a back flow-path outlet of the "6 inch deluxe TT 17×15 complete 3 up" flow model, in accordance with an embodiment of the present subject matter.

Figure 13:
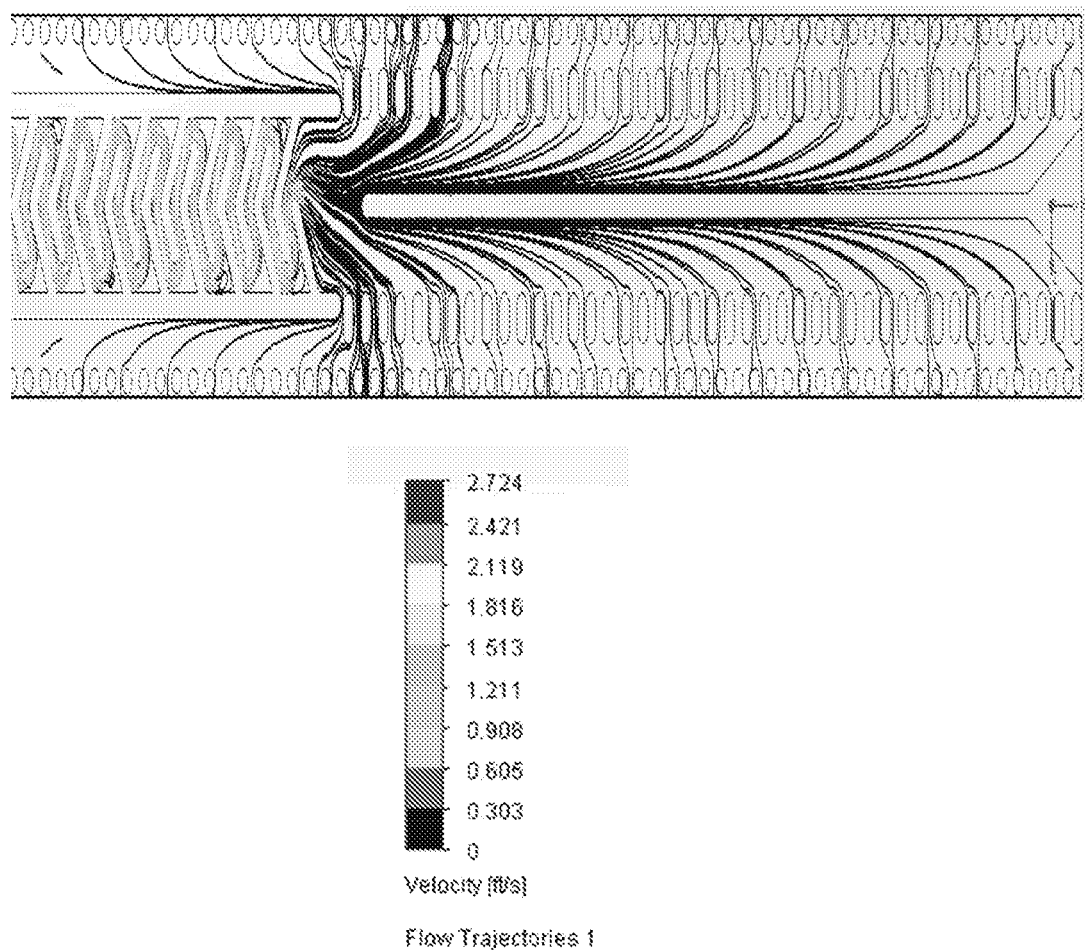
FIG. 13 illustrates a flow-path inlet of the "8 inch deluxe TT 17×15" flow model, in accordance with an embodiment of the present subject matter.

FIG. 13 illustrates a flow-path inlet of the "8 inch deluxe TT 17×15" flow model, in accordance with an embodiment of the present subject matter. In the "8 inch TT Deluxe 17×15" flow model, the flow-rate per device is 0.2527LPH (Liters per hour) or 0.066756274GPH (Gallons per hour) or 0.001112605GPM (Gallons per minute) or 0.166890685GPM per 100 feet.

Figure 14:
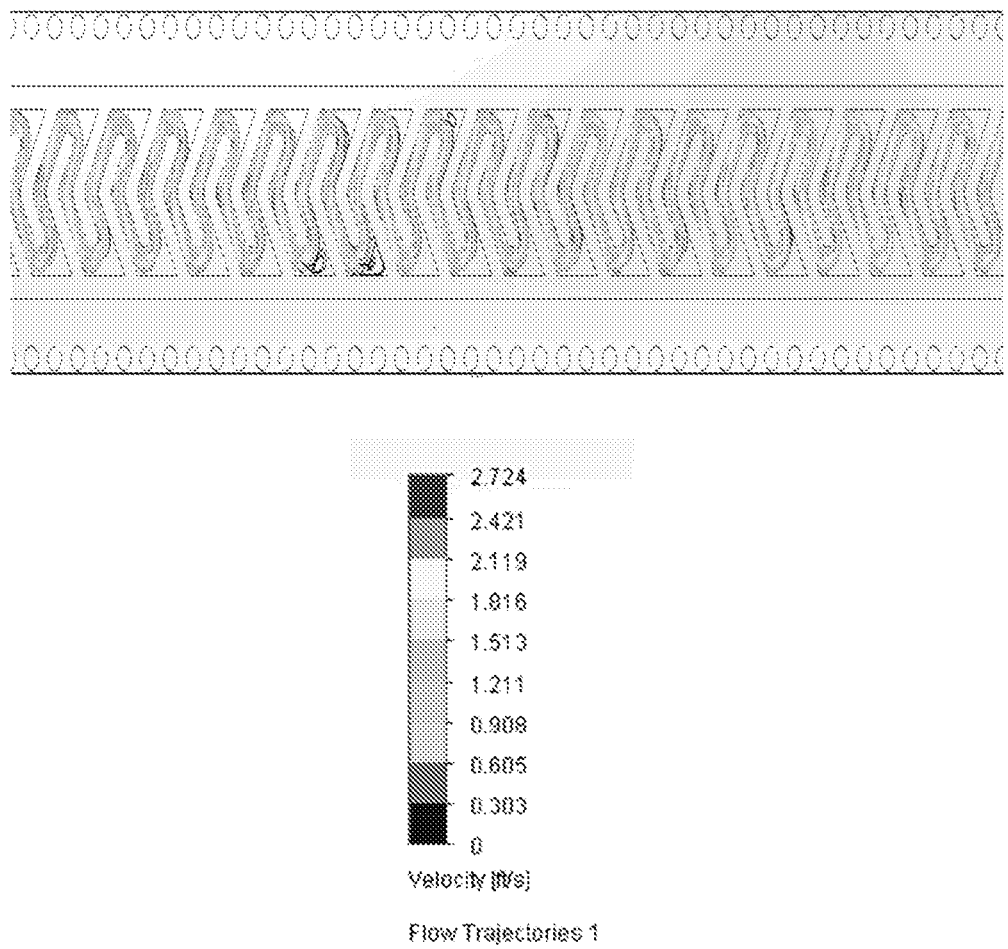
FIG. 14 illustrates a flow-path middle of the "8 inch deluxe TT 17×15" flow model, in accordance with an embodiment of the present subject matter.

FIG. 14 illustrates a flow-path middle of the "8 inch deluxe TT 17×15" flow model, in accordance with an embodiment of the present subject matter.

Figure 15:
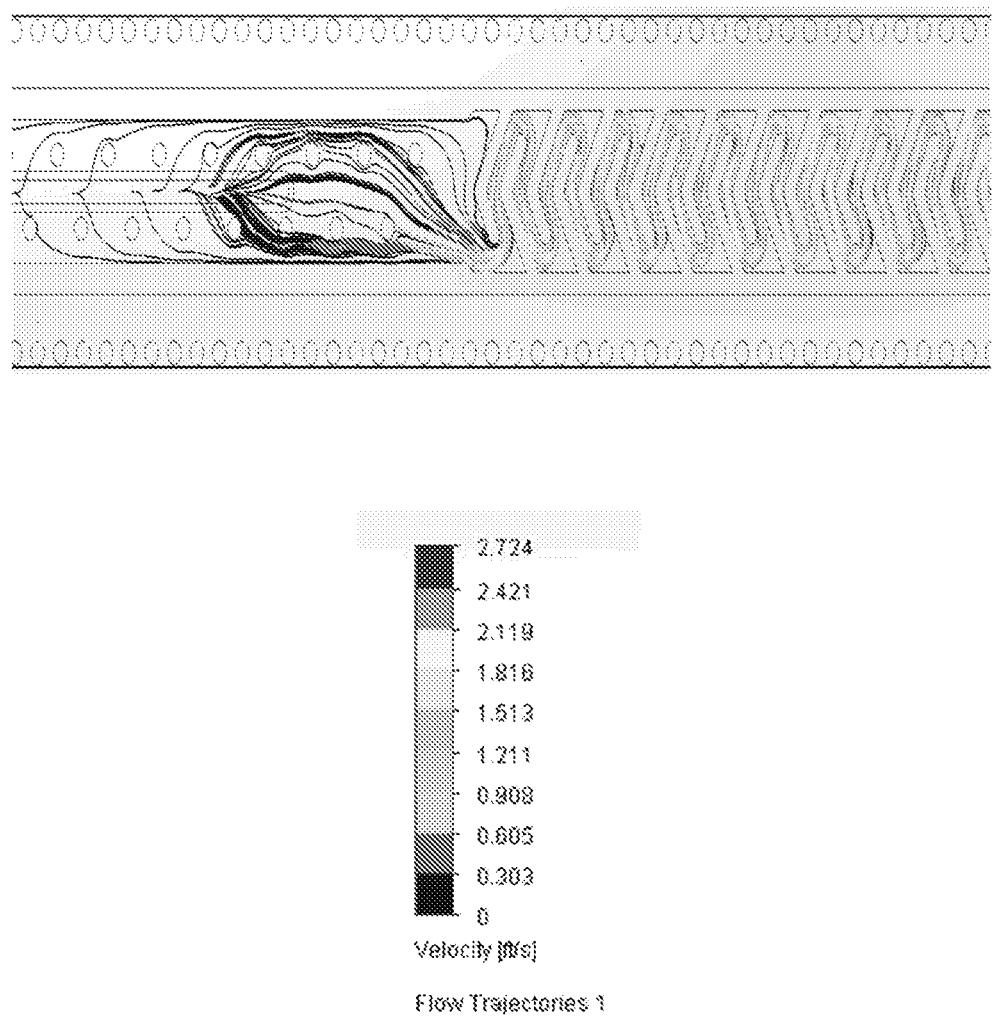
FIG. 15 illustrates a flow-path outlet of the "8 inch deluxe TT 17×15" flow model, in accordance with an embodiment of the present subject matter.

FIG. 15 illustrates a flow-path outlet of the "8 inch deluxe TT 17×15" flow model, in accordance with an embodiment of the present subject matter.

We claim:

1. A low flow drip emitter device, comprising:
three distinct flow-paths in the device, wherein the three distinct flow-paths are a front flow-path, a middle flow-path, and a back flow-path
the front flow-path comprising a plurality of front flow-path holes running along a first edge and a second edge of the emitter, wherein the first edge and the second edge run along the length of the emitter;
an echelon shaped teeth portion running parallel to the first edge and the second edge, wherein the echelon shaped teeth portion at least partially extends between a first side and a second side to form the middle flow path with a plurality of middle flow-path holes running along a periphery and spaced from the echelon shaped teeth portion, wherein a gap between two consecutive teeth of the echelon shaped teeth portion is formed based on a distance between the two consecutive teeth, thereby creating a cross-sectional area of the middle flow path, with one or more vectors;
the back flow-path comprises a plurality of back-flow path holes running along the periphery, and
the front flow-path and the back flow-path are free of echelon shaped teeth; and
wherein:
each of the plurality of echelon shaped teeth proximate to the first edge have an upstream protruding portion attached to a downstream protruding portion, wherein a first, non-zero angle is formed between the upstream protruding portion and then downstream protruding portion, and the upstream protruding portion has a thickness that is different than a thickness of the downstream protruding portion,
each of the plurality of echelon shaped teeth proximate to the second edge have an upstream protruding portion attached to a downstream protruding portion, wherein a second angle is formed between the upstream protruding portion and the downstream protruding portion, and the upstream protruding portion has a thickness that is different than a thickness of the downstream protruding portion, and
the upstream protruding portion of the plurality of echelon shaped teeth proximate to the first edge are substantially parallel to the downstream protruding portion of the plurality of echelon shaped teeth proximate to the second edge, and, the upstream protruding portion of the plurality of echelon shaped teeth proximate to the second edge are substantially parallel to the downstream protruding portion of the plurality of echelon shaped teeth proximate to the first side.

2. The low flow drip emitter device of claim 1, wherein the front flow-path has a discharge rate of 0.348357 Liters per hour.

3. The low flow drip emitter device of claim 1, wherein the middle flow-path has a discharge rate of 0.347652 Liters per hour.

4. The low flow drip emitter device of claim 1, wherein the back flow-path has a discharge rate of 0.348174 Liters per hour.

\* \* \* \* \*